United States Patent
Zhang et al.

(10) Patent No.: US 10,346,861 B2
(45) Date of Patent: Jul. 9, 2019

(54) ADAPTIVE SAMPLING SCHEME FOR IMBALANCED LARGE SCALE DATA

(71) Applicant: ADOBE INC., San Jose, CA (US)

(72) Inventors: Wei Zhang, Great Falls, VA (US); Said Kobeissi, Lovettsville, VA (US); Anandhavelu Natarajan, Bangalore (IN); Shiv Kumar Saini, Rajasthan (IN); Ritwik Sinha, Kolkata (IN); Scott Allen Tomko, Leesburg, VA (US)

(73) Assignee: ADOBE INC., San Jose, CA (US)

( * ) Notice: Subject to any disclaimer, the term of this patent is extended or adjusted under 35 U.S.C. 154(b) by 678 days.

(21) Appl. No.: 14/933,254

(22) Filed: Nov. 5, 2015

(65) Prior Publication Data
US 2017/0132516 A1    May 11, 2017

(51) Int. Cl.
G06N 3/08        (2006.01)
G06Q 30/02      (2012.01)

(52) U.S. Cl.
CPC .......... *G06Q 30/0202* (2013.01); *G06N 3/08* (2013.01)

(58) Field of Classification Search
USPC ...................................... 706/46, 45
See application file for complete search history.

(56) References Cited

PUBLICATIONS

Zhang, Multi-Modal Smart Sensing Network for Marine Environmental Monitoring, Doctoral Thesis, Dublin City University, 2015, pp. 1-166 (Year: 2015).*

* cited by examiner

*Primary Examiner* — Wilbert L Starks
(74) *Attorney, Agent, or Firm* — Shook, Hardy & Bacon L.L.P.

(57) ABSTRACT

Embodiments of the present invention relate to providing business customers with predictive capabilities, such as identifying valuable customers or estimating the likelihood that a product will be purchased. An adaptive sampling scheme is utilized, which helps generate sample data points from large scale data that is imbalanced (for example, digital website traffic with hundreds of millions of visitors but only a small portion of them are of interest). In embodiments, a stream of sample data points is received. Positive samples are added to a positive list until the desired number of positives is reached and negative samples are added to a negative list until the desired number of negative samples is reached. The positive list and the negative list can then be combined, shuffled, and fed into a prediction model.

20 Claims, 4 Drawing Sheets

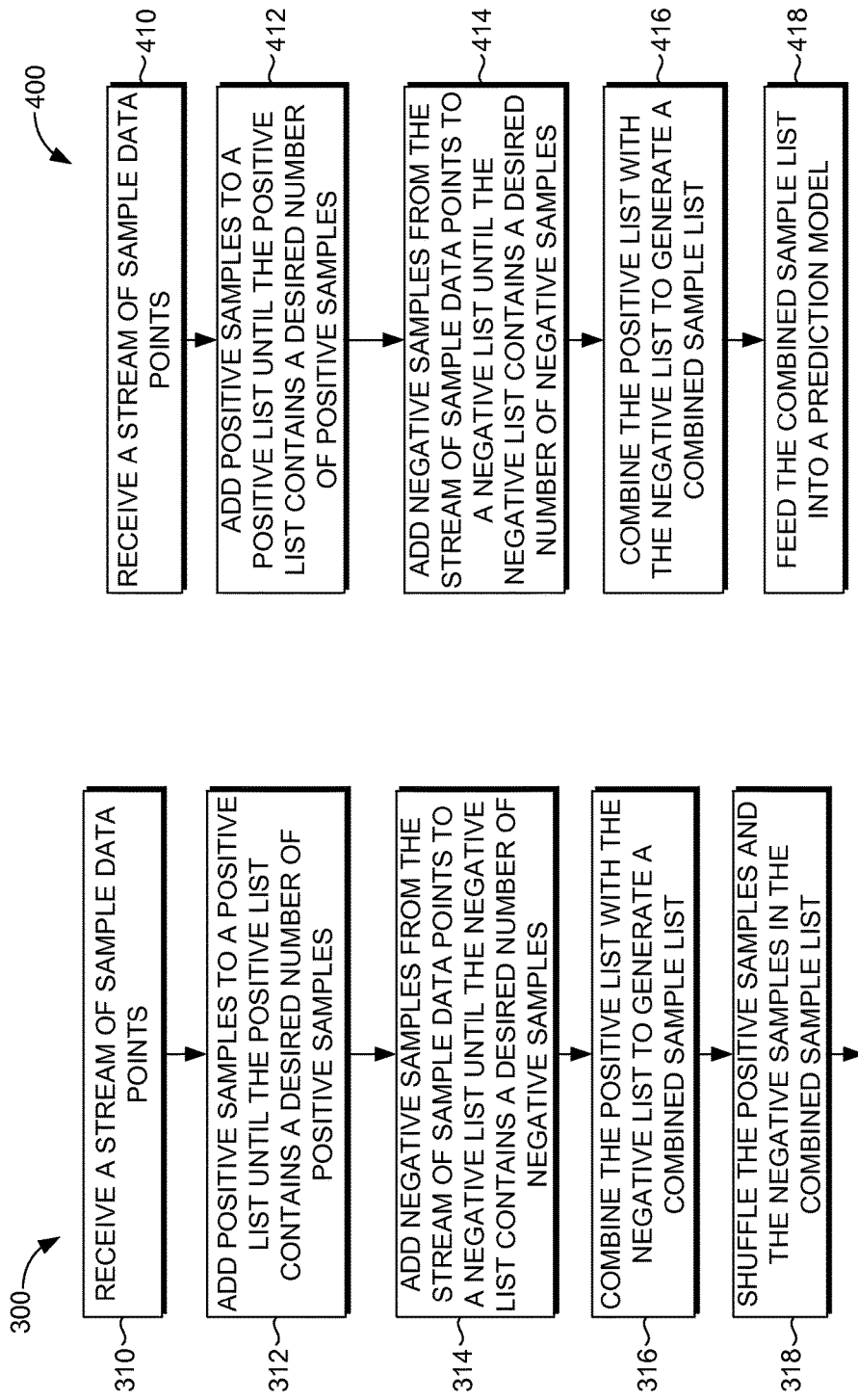

ADAPTIVE SAMPLING SCHEME FOR IMBALANCED LARGE SCALE DATA

BACKGROUND

Website traffic data often comprises many millions of visitors, while only a small portion of these visitors actually generate revenue. Imbalanced data refers to data that exhibits between-class imbalance, for example, a few objects/events of interest (referred to herein as positives) vs. a large number of irrelevant cases (referred to herein as negatives). Data imbalance may be categorized as two types: intrinsic and extrinsic. Intrinsic refers to the imbalance resulting from the nature of the dataspace. Extrinsic refers to other cases, for instance, a stream of data that is balanced overall but not uniformly distributed (thus a data sample might be imbalanced for some interval).

Because businesses deal with very large amounts (hundreds of millions) of data, it is impractical to feed all the data points to a prediction module that may be utilized to identify potentially valuable customers. Moreover, to satisfy customers and avoid unnecessary website delays, prediction models need to work in near real time. Further, because of memory and efficiency constraints, the prediction models need to work with a sample of data, rather than the entire data set. However, taking a sample of data can make the imbalance problem even worse in several ways: 1) the absolute number of positive cases will be significantly reduced; and 2) if the data is not uniformly distributed, the percentage of positive cases in a random sample could be even less than the original data (the extrinsic imbalance).

In general, standard algorithms for learning and predicting expect balanced class distributions. When dealing with imbalanced data containing only a small number of positives, they tend to overfit training data and perform unfavorably on unseen testing data. In addition, the resulting model is unstable and hardly repeatable. Thus the estimated models are noisy and unlikely to produce reliable predictions.

SUMMARY

Embodiments of the present invention relate to providing business customers with predictive capabilities (for example, identifying valuable customers or estimating the likelihood that a product will be purchased). An adaptive sampling scheme is utilized, which helps generate sample data points from large scale data that is imbalanced (for example, digital website traffic with hundreds of millions of visitors but only a small portion of them are of interest). In embodiments, a stream of sample data points is received. Positive samples are added to a positive list until the desired number of positives is reached and negative samples are added to a negative list until the desired number of negative samples is reached. The positive list and the negative list can then be combined, shuffled, and fed into a prediction model. Consequently, the prediction is significantly improved with negligible variance and the model outcomes are repeatable and reliable.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 3 is a flow diagram showing a method for identifying positive samples utilizing an adaptive sampling scheme for imbalanced large scale data, in accordance with embodiments of the present invention;

FIG. 4 is a flow diagram showing a method for identifying negative samples utilizing an adaptive sampling scheme for imbalanced large scale data, in accordance with embodiments of the present invention.

DETAILED DESCRIPTION

Figure 1:
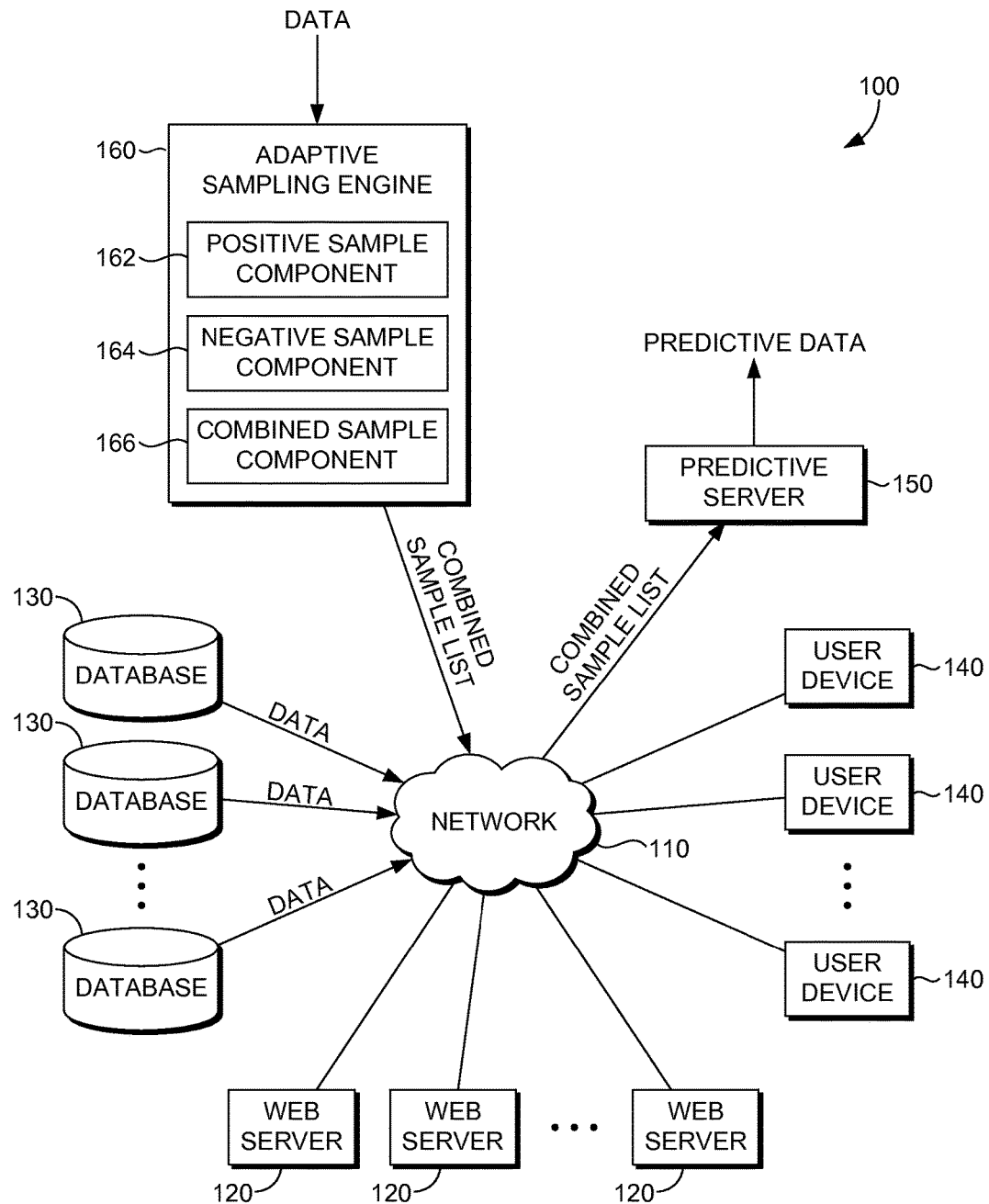
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein.

A "positive" or "positive sample" includes web traffic data that is valuable to a business or entity associated with a web site. The positives may reflect that a customer made a purchase or interacted with the site in a way that the business or entity values and wants repeated. For example, the customer may have purchased goods or services provided by the web site. Or, the customer may have reached a threshold dollar amount of purchased goods or services provided by the web site. Similarly, the customer may have consumed or interacted with content associated with the web site. Or, the customer may have reached a threshold consumption or interaction amount for content associated with the web site. In this way, the positives may reflect that not only did the customer make a purchase or interact with the site, but they did so beyond a threshold amount that the business or entity values and wants repeated.

A "negative" or "negative sample" refers to data points that are not valuable to a business or entity associated with a web site. The negatives may reflect that a customer did not purchase or interact with the site in a way that the business or entity values. For example, the customer may not have purchased goods or services provided by the web site. Or, the customer may have not have reached a threshold dollar amount of purchased goods or services provided by the web site. In another example, the customer may not have consumed or interacted content associated with the web site. Or, the customer may have not have reached a threshold consumption or interaction amount for content associated with the web site. In this way, the negatives may reflect that even though the customer made a purchase or interacted with the site, the customer did not do so beyond a threshold amount that the business or entity values and wants repeated.

The term "severely imbalanced data" or "imbalanced data" refers to data that exhibits between-class imbalance. For example, the data may include a few objects/events of interest (i.e., positives) and a large number of irrelevant cases (i.e., negatives). Imbalanced data may be intrinsic (resulting from the nature of the dataspace) or extrinsic (for example, a stream of data which may be balanced overall but not uniformly distributed, thus a sample may be imbalanced over some interval).

A "prediction model" refers to a mathematical model that can be used to predict the likelihood that a particular user is likely to be valuable customer. The prediction model may additionally or alternatively estimate the likelihood that a product will be purchased. The prediction model may learn based on negative and positive samples that are fed to the model. The prediction model may, in real-time, classify incoming visitors to a web site as a positive or negative. Accordingly, the web site may alter content provided to the visitor based on the classification.

A "predicator variable" is a customer attribute, which can be continuous (numeric) values (for example, revenue, count of orders, number of times someone activated a device) or categorical values (for example, United States, Brazil, www.google.com, www.yahoo.com are categorical values for country and referring domain).

A "parameter" refers to a model parameter, which is the numerical value that characterizes a prediction model. The prediction model may be defined by a number of predictor variables and their associated parameters. For example, the parameters of a logistic regression model define how different customer predictor variables (for example, age, gender, and/or page views) can be combined to predict the output probability.

As mentioned briefly above, a sample of data is needed for the prediction model. The performance (response time and accuracy) of the prediction model is highly dependent on the sampling stage. Therefore, data sampling is a key component and critical to the design of an efficient sampling solution. In previous approaches, a business user specifies a sample size S, and the system randomly identifies a sample of S data points. In distributed systems a cluster of K machines may store and process data. Each machine in the cluster contains 1/K of the entire data. During the random sampling stage, each machine randomly selects S/K data points from its storage. After all machines have sampled data, those data points are combined as one final sample.

Unfortunately, these previous approaches suffer from imbalanced data, which poses a substantial challenge to predictive models. The random samples obtained in this way are not usable by predictive models because too few positives may be retained in a given sample. For example, using www.ADOBE.com web traffic data (as described in more detail below), even a relatively large sample of size two hundred thousand data points may only contain eighty positives. No matter what method is utilized to train the prediction model, for example logistic regression or decision tree, the prediction model performs poorly in identifying positives (which is really what business users are attempting to identify). With approximately 99.95% of data as negatives, classifying every case as a negative provides very little meaning or usefulness. To compensate, some solutions have increased the weight of positives so that they provide more meaning relative to the overall sample size. However, this makes these systems very prone to overfitting. In other words, they only work to identify positives in the training set, but perform poorly for unseen (testing) data.

A minimum number of positives may be needed to have stable logistic regression estimates. For a sample of size two hundred thousand, at least two hundred positives for each parameter being estimated in the model is needed. For an estimation involving ten parameters, at least two thousand positives are needed. As can be appreciated, the more positives available, the more stable the estimation.

Some solutions have also attempted to post-process the sample to increase the ratio of positive vs. negative cases using SMOTE algorithm, which is a state of the art algorithm to create artificial positives from the true positives (by interpolating between neighboring positive points). However, the post-processing process utilizing a limited number of positives is insufficient to capture the distribution of positives. This is because of the so called "curse of dimensionality": when data is high dimensional, a very large number of data points are needed to cover the distribution over high dimensional data. Consequently, the artificially created positives are not meaningful and a valid classifier cannot be built.

Embodiments of the present invention generally relate to providing an adaptive sampling scheme for imbalanced large scale data. Initially, the data is treated as a stream, which provides flexibility and efficiency, as discussed below. The adaptive sampling scheme handles the severe data imbalance problem, which frequently appears in the large scale data inherent to digital marketing (for example, digital website traffic data), for both intrinsic and extrinsic imbalances. The adaptive sampling scheme provides business customers with a practical and reliable predictive analytic capability which is not available in previous sampling systems.

As described in more detail below, in the adaptive sampling scheme, when the data is imbalanced (very few positives), the adaptive sampling scheme scans through only the portion of data needed to obtain enough positives. In the worst case when the positives are extremely rare, the algorithm might scan through the entire data set to form a more meaningful sample. On the other hand, when the data is less imbalanced or even balanced, the algorithm may stop sampling early because enough positives can be retrieved from a smaller portion of data. In this way, the process is very efficient for balanced data, and as fast as possible for imbalanced data. In other words, the process adapts to the distribution of the data. In embodiments, the process obtains a quality sample regardless of whether the imbalance is intrinsic or extrinsic and without the need to know a priori the type of imbalance.

In contrast, other sampling methods (for example, undersampling negatives, oversampling positives, or synthetic minority oversampling technique (SMOTE)), go through the entire data set. This is very expensive for the significant amount of data that typically needs processed, which is especially problematic given the need to identify valuable customers in real-time. The adaptive sampling scheme only needs to scan the entire data when absolutely necessary (the case of extremely rare positives). However, in the majority of cases, the adaptive sampling scheme finishes much earlier and ensures the efficiency of the system.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as environment 100. The environment 100 of FIG. 1 includes web server(s) 120, database(s) 130, user device(s) 140, an adaptive sampling engine 160, and a predictive server 150. Each of the web server(s) 120, database(s) 130, user device(s) 140, an adaptive sampling engine 160, and predictive server 150 may be, or include, any type of computing device (or portion thereof) such as computing device 500 described with reference to FIG. 5, for example. The components may communicate with each other via a network 110, which may include, without limitation, one or more local area networks (LANs) and/or wide area networks (WANs). Such networking environments are commonplace in offices, enterprise-wide computer networks, intranets, and the Internet.

It should be understood that any number of web servers, databases, user devices, adaptive sampling engines, and predictive servers may be employed within the environment 100 within the scope of the present invention. Each may comprise a single device or multiple devices cooperating in a distributed environment. For instance, the adaptive sampling engine 160 and/or predictive server 150 may be provided via multiple devices arranged in a distributed environment that collectively provide the functionality described herein. Similarly, all or portions of the functionality provided by the adaptive sampling engine 160 may be provided by other components, such predictive server 150 (or vice versa). Additionally, other components not shown may also be included within the environment 100, while components shown in FIG. 1 may be omitted in some embodiments.

The user device(s) 140 may be any type of computing device owned and/or operated by a user that can access network 110. For instance, the user device(s) 140 may be a desktop computer, a laptop computer, a tablet computer, a mobile device, a wearable device or any other device having network access. Generally, a user may employ the user device(s) 140 to, among other things, access one or more web servers 120. For example, the user may employ a web browser or application on the user device(s) 140 to access and/or buy goods or services provided by the web servers 120.

The user database(s) 130 may be any type of device capable of hosting and serving data to computing devices, such as the web server(s) 120, the user device(s) 140, the adaptive sampling engine 160, and/or the predictive server 150. By way of example, and not limitation, the user database(s) 130 may be a server maintaining user data and/or business data utilized by adaptive sampling engine 160 and/or the predictive server 150 to predict valuable customers or estimate the likelihood that a product will be purchased that, in turn, provides various functionality to the web server(s) 120 (for example, offering incentives, providing multimedia content to valuable users, or otherwise communicate differently with potentially valuable customers).

The adaptive sampling engine 160 is generally configured to generate sample data points from large scale data that is imbalanced. Typically, adaptive sampling engine 160 communicates with the web server(s) 120, the database(s) 130, and the predictive server 150 to generate a sample data set includes a random sample of the original data even if the original data distribution is highly skewed. In this way, the adaptive sampling engine 160 obtains an independent and identically distributed data sample that enables the predictive server 150 to more accurately and precisely predict valuable customers or estimate the likelihood that a product will be purchased by a user via the user device 140. The web server(s) can utilize the predictions to provide additional or different content based on the predictions that may further increase the opportunity to monetize a particular interaction with a user. Additionally, the web server(s) can utilize the predictions to avoid providing additional or different content based on the predictions when it is unlikely that monetization for a particular interaction with a user will occur. In this way, a business operating the web server(s) can be more efficient in delivering content to the right user at the right time and avoid unnecessary expenses or efforts.

In accordance with embodiments described herein, the adaptive sampling engine 160 includes a positive sample component 162, a negative sample component 164, and a combined sample component 166. It should be understood that this and other arrangements described herein are set forth only as examples. Other arrangements and elements (for example, machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In some embodiments, one or more of the illustrated components/modules are implemented as stand-alone applications. In other embodiments, one or more of the illustrated components/modules are integrated directly into the operating system of the adaptive sampling engine 160. The components/modules illustrated in FIG. 1 are exemplary in nature and in number and should not be construed as limiting. Any number of components/modules may be employed to achieve the desired functionality within the scope of embodiments hereof. Further, components/modules may be located on any number of servers, computing devices, or the like. By way of example only, the adaptive sampling engine 160 might reside on a server, cluster of servers, or a computing device remote from or integrated with one or more of the remaining components.

The adaptive sampling engine 160 may be any type of computing device, or incorporated into a computing device, that can access a network (for example, network 110). For instance, the adaptive sampling engine 160 may be a desktop computer, a laptop computer, a tablet computer, a mobile device, a server, or any other device, or portion thereof, having network access. Generally, a business user may employ the adaptive sampling engine 160 to, among other things, generate sample data points from large scale data that is imbalanced.

As used herein, N represents the target number of observations in a sample (i.e., a business user defined sample size that is fed into the prediction server 150, for example 200 k). M represents the number of parameters to be estimated in the data (for example, the number of channels in attribution or number of predictors in the propensity model). $N_r$ is the number of desired positives and is related to both N and M. In an exemplary embodiment, $N_r=0.1*N*M$ for reliable parameter estimation. In this case, 0.1 represents an exemplary multiplier. As used herein, $N_n$ is the current number of negatives collected by negative sample component 164. $N_p$ represents the number of positives currently collected by the positive sample component 162. $N_s$ is the total number of current observations.

In embodiments, the adaptive sampling scheme can be described for each incoming observation by the following. If the sample data point is a negative, the negative sample component 164 utilizes a technique known as reservoir sampling. If $N_n < N - N_r$ (i.e., if the current number of negatives in the sample is less than the target number of observations minus the desired number of positives), the sample is added by negative sample component 164 to the list of negatives ($L_n$), which can be denoted as $L_n : N_n = N_n + 1$. On the other hand, if $N_n = N - N_r$ (i.e., if the current number of negatives in the sample is equal to the target number of observations minus the desired number of positives), the negative sample component 164 replaces a negative observation from with the sample with some probability (for example, $N_n/N_s$. By replacing negatives in the negative list in this way, the negative sample component 164 helps maintain a uniform sampling of negatives from the original data (and negatives are replaced uniformly). Adaptive sampling engine 160 continues to fetch additional samples from database(s) 130.

If the sample data point is a positive and $N_p < N_r$ (i.e., the current number of positives in the sample is less than the desired number of positives), the positive sample component 162 adds the sample to the list of positives ($L_p$), which can be denoted as $L_p : N_p = N_p + 1$ and another sample is fetched from database(s) 130 by adaptive sampling engine 160. If however, $N_n + N_p = N$, the desired data sample has been obtained and the adaptive sampling engine 160 can stop sampling. Combined sample component 166 combines $L_p$ and as the final sample.

When there is no data left but the desired data sample has not yet been obtained, adaptive sampling engine 160 stops sampling and combined sample component 166 combines $L_p$ and as the final sample (in this case, that is the best sample that can be obtained). In this case, the adaptive sampling engine 160 may provide the combined list with a warning indicating that the desired data sample was not obtained.

In embodiments, the samples are obtained from a cluster of machines. In this case, N and $N_r$ are divided by K when doing the cluster sampling within each machine. Once the sampling is done in all machines, the result samples are combined into one final sample. The data points in this final sample are randomly shuffled before feeding to the prediction module for training and testing purposes.

In actual experiments conducted with www.ADOBE.com web traffic data, eighty percent of the data was utilized for training and twenty percent of the data was utilized as testing for evaluation. An accurate system predicts actual negatives as predicted negatives and actual positives as predicted positives. Precision and recall were utilized to quantitatively measure the performance. For clarity, recall refers to the ratio of predicted positives over actual positives, which measures how likely the true positive is identified as a positive. Precision measures the probability that predicted positives are true positives and is defined as the ratio of predicted positives over (predicted positives plus the number of true negatives that are predicted as positives.

In a result without the adaptive sampling scheme, the recall was 0.042 and the precision was 0.267. In other words, without applying the adaptive sampling scheme, very low recall (i.e., positives were rarely detected) and precision (few predicted positives were true positives) was observed, thus leading to a very low (0.073) F-Score (i.e., a metric for evaluating classification performance). After applying the adaptive sampling scheme, recall rose to 0.821 and precision increased to 0.938. In other words, most positives (which are the valuable targets) were identified and the F-Score was more than 10 times better (0.876) than without the adaptive sampling scheme.

In some embodiments, the adaptive sampling engine 160 maintains positives and negatives into two separate lists until the desired capacity. When the desired capacity is reached, the adaptive sampling engine 160 stops sampling. Although this is efficient, as it just uses the first $N-N_r$ negatives in the original data and stops processing further negatives. However, it is only optimal when the data distribution is independent and identically distributed. When the data is not perfectly independent and identically distributed, there is a risk of having biased negative samples. In other words, the negatives in the testing data might only represent a small distribution of the negatives obtained from a small number of samples. Consequently, unstable results may result. When the data is imbalanced, a large number of negatives will be observed before obtaining enough positives, and the majority of those negatives are thrown away decreasing the opportunity to get more independent and identically distributed negative samples.

In some embodiments, the adaptive sampling engine 160 scans through the entire dataset and reservoir sampling is maintained for both positives and negatives. In this way a random sample of the original data is ensured even if the original data distribution is highly skewed. In other words, independent and identically distributed data samples are obtained. Any overhead in the adaptive sampling scheme is limited to a random number generator for each negative (i.e., no extra loading cost since it's already loaded for categorization). Modern computers can generate approximately one billion random numbers per second in one second and in a clustered setting, each machine works in parallel. Even in an extreme case where one hundred million negatives are needed to reach the desired sample, a ten machine cluster only has an overhead of approximately 0.01 seconds, while the sampling time itself is approximately ten seconds (because of latency in loading data from disk). Thus, the ratio of overhead vs. original time is approximately 0.1 percent, which is negligible.

On the other hand, this trivial overhead provides robustness against non-independent and identically distributed data by obtaining an independent and identically distributed sample of all the negatives observed until the adaptive sampling scheme stops. Even if the original data is not completely independent and identically distributed data, a random sample is still obtained from a large number of negatives sampled. Thus, the sample is likely to have an acceptable coverage of the distribution of negative data which leads to more stable results than that the first alternative does. It should be appreciated that the desired number of positives $N_r$ is set to be a relatively large number, which ensures a good coverage of positive data. Experiments have shown that using more positives reduces the variance in model estimation.

Figure 2:
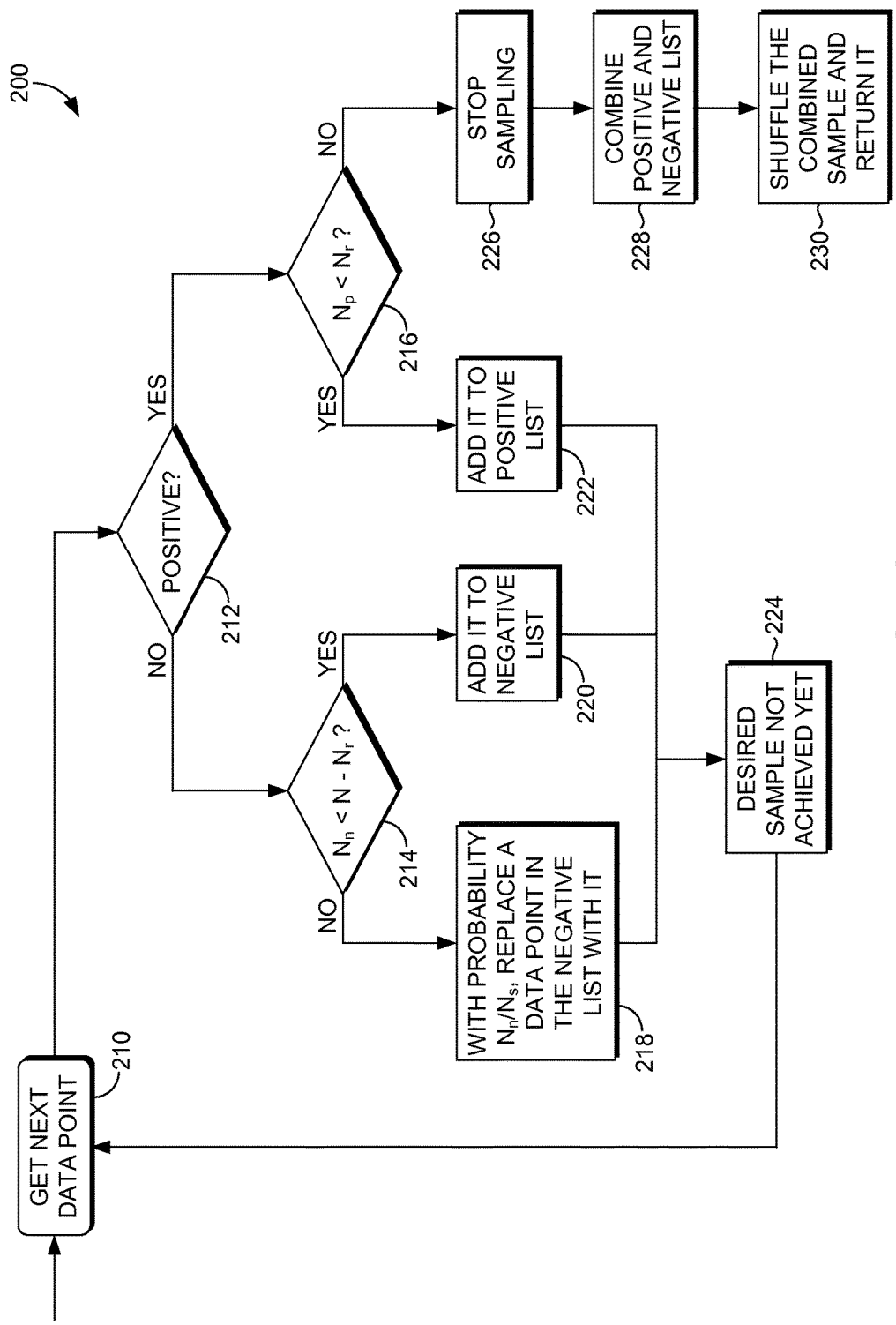
FIG. 2 is a flow diagram showing a method for providing an adaptive sampling scheme for imbalanced large scale data, in accordance with embodiments of the present invention.

Referring now to FIG. 2, a flow diagram is provided that illustrates a method 200 for the adaptive sampling scheme, in accordance with an embodiment of the present invention. Such a method can be performed, for example, at an adaptive sampling engine, such as adaptive sampling engine 160 of FIG. 1. Each step of the method 200 and any other method discussed herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 200 may be performed using a computing device, such as the computing device 500 of FIG. 5.

Initially, at step 210, a data point is fetched. At step 212, it is determined if the data point is a positive. If the data point is a positive, and the current number of positives is determined, at step 216, to be less than the desired number of positives, the data point is added to a positive list at step 222. The desired sample has not yet been achieved, at step 224, and another data point is fetched at step 210. If, on the other hand, the data point is a positive, and the current number of positives is determined, at step 216, to be equal to the desired number of positives, sampling is stopped at step 226. The positive and negative lists are combined at step 228. Additionally, the combined lists is shuffled and returned at step 230 to be used by a predictive model.

If the data point is determined to be a negative at step 212, it is further determined, at step 214, whether the current number of negatives is less than the target number of observations minus the number of desired positives. If yes, the data point is added to the negative list at step 220. If no, the data point replaces a negative in the negative sample at step 218. The desired sample has not yet been achieved, at step 224, and another data point is fetched at step 210.

In FIG. 3, a flow diagram is provided that illustrates a method 300 for identifying positive samples utilizing an adaptive sampling scheme for imbalanced large scale data, in accordance with an embodiment of the present invention. Such a method can be performed, for example, at an adaptive sampling engine, such as adaptive sampling engine 160 of FIG. 1. As can be appreciated, additional or alternative steps may also be included in different embodiments. Initially, as indicated at step 310, a sample data point is received. The sample data point is received from a data set of imbalanced data, such as may be stored by a database associated with a web server.

In some embodiments, a sample data point is determined to be a positive sample. In this way, the sample data point reflects that a customer associated with the sample data point purchased goods or services associated with a web site (or otherwise interacted with the web site in a way that provided value to the business or entity associated with the web site). The positive samples are added, at step 312, to a positive list until the number of desired positives is reached. The number of desired positive cases is equal to the target number of observations in a sample times the number of parameters to be estimated in the data times a multiplier (for example, 0.1).

In some embodiments, a sample data point is determined to be a negative sample. If it is determined that the additional sample data point is a negative, negative samples are added, ate step 314, to a negative list until the desired number of negative samples is reached. If the desired number of negative samples has already been reached, the negative sample replaces an existing negative sample in the negative list.

At step 316, the negative list is combined with the positive list. The positive samples and the negative samples are then shuffled at step 318. The combined sample list is fed into a prediction model, at step 320, as described herein.

In some embodiments, the sample data points are received from a cluster of machines. Each machine in the cluster contributes to a representative portion of the sample data points and each machine in the cluster maintains a unique positive and negative list. In embodiments, the unique positive and negative lists are combined. The combined sample list can then be fed into a prediction model, for purposes described herein.

Turning now to FIG. 4, a flow diagram is provided that illustrates a method 400 for identifying negative samples utilizing an adaptive sampling scheme for imbalanced large scale data, in accordance with an embodiment of the present invention. Such a method can be performed, for example, at an adaptive sampling engine, such as adaptive sampling engine 160 of FIG. 1. As can be appreciated, additional or alternative steps may also be included in different embodiments. Initially, as indicated at step 410, a stream of sample data points is received. The sample data points are received from an imbalanced large scale data set, such as data that may be stored in a database and used in association with a web server.

At step 412, positive samples are added to a positive list until the number of desired positives is reached. In some embodiments, the number of desired positive cases is equal to the target number of observations in a sample times the number of parameters to be estimated in the data times a multiplier (for example, 0.1).

At step 414, negative samples are added from the stream of sample data points to a negative list until the negative list contains a desired number of negative samples. The negative samples may not associated with a sale or purchase of goods or services (or otherwise some form of consumption of content) via the web server. If the current number of negative samples in the negative list is less than the number of target observations minus the desired positive cases, then the negative sample is added to the negative list. If the current number of negative samples in the negative list is equal to the number of target observations minus the desired positive cases, then the negative sample replaces an existing negative sample in the negative list, as described herein.

At step 416, the negative list is combined with the positive list. The positive samples and the negative samples in the combined sample list may be shuffled. At step 418, the combined sample list is fed into a prediction model, as described herein.

Having described an overview of embodiments of the present invention, an exemplary computing environment in which some embodiments of the present invention may be implemented is described below in order to provide a general context for various aspects of the present invention.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 5:
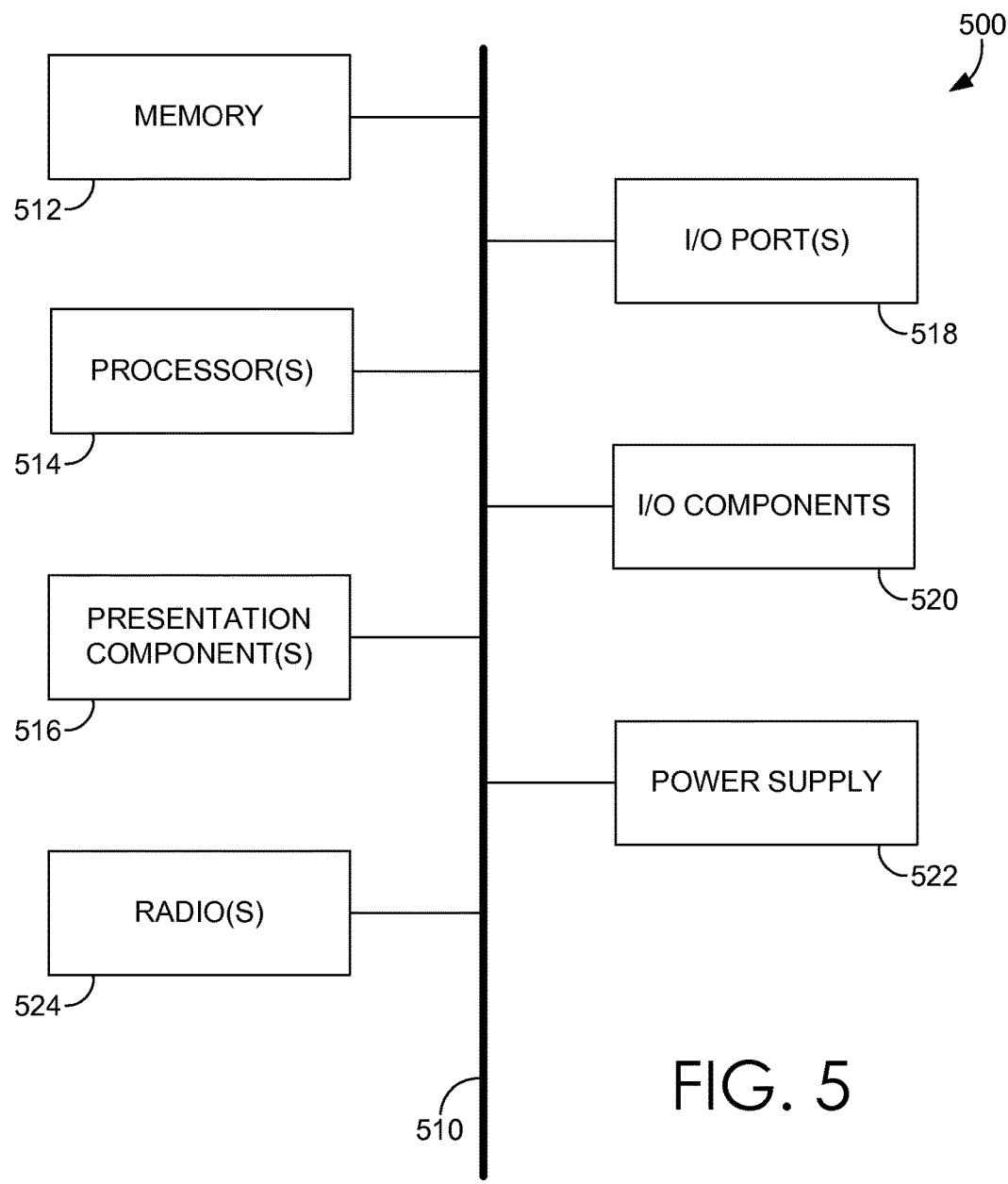
FIG. 5 is a block diagram of an exemplary system in which embodiments of the invention may be employed.

Accordingly, referring generally to FIG. 5, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

With reference to FIG. 5, computing device 500 includes a bus 510 that directly or indirectly couples the following devices: memory 512, one or more processors 514, one or more presentation components 516, input/output (I/O) ports 518, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterates that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

As can be understood, embodiments of the present invention provide for, among other things, providing an adaptive sampling scheme for imbalanced large scale data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform a method for providing adaptive sampling scheme for imbalanced large scale data set, the method comprising:
    receiving, over a wired or wireless computer network, a stream of sample data points from the imbalanced large scale data set, the imbalanced large scale data set corresponding to network traffic data associated with one or more server computing devices;
    adding positive samples from the stream of sample data points to a positive list until the positive list contains a desired number of positive samples, the desired number of positive samples being equal to a target number of observations in a sample times the number of parameters to be estimated in the imbalanced large scale data set times a multiplier;
    adding negative samples from the stream of sample data points to a negative list until the negative list contains a desired number of negative samples;

combining the positive list with the negative list to generate a combined sample list, the combined sample list comprising a random sample of the imbalanced large scale data set;

shuffling the positive samples and the negative samples in the combined sample list;

feeding the combined sample list into a prediction model enabling the prediction model to provide predictive capabilities with negligible variance for the imbalanced large scale data set; and providing, over the wired or wireless computer network and to the one or more server computing devices, an estimate associated with the predictive capabilities.

2. The one or more computer storage media of claim 1, further comprising determining a sample data point is a positive sample.

3. The one or more computer storage media of claim 1, further comprising determining a sample data point is a negative sample.

4. The one or more computer storage media of claim 3, further comprising replacing an existing negative sample in the negative list when Nn=N−Nr with probability Nn/Ns.

5. The one or more computer storage media of claim 1, wherein the stream of sample data points are received from a cluster of machines.

6. The one or more computer storage media of claim 5, wherein each machine in the cluster contributing to a representative portion of the sample data points and each machine in the cluster maintaining a unique positive and negative list.

7. The one or more computer storage media of claim 6, further comprising combining the unique positive and negative lists.

8. A method for providing adaptive sampling scheme for imbalanced large scale data, the method comprising:

receiving, by one or more processors and over a computer network, a stream of sample data points from the imbalanced large scale data set, the imbalanced large scale data set corresponding to network traffic data associated with one or more server computing devices;

adding, by the one or more processors, positive samples from the stream of sample data points to a positive list until the positive list contains a desired number of positive samples;

adding, by the one or more processors, negative samples from the stream of sample data points to a negative list until the negative list contains a desired number of negative samples;

combining, by the one or more processors, the positive list with the negative list to generate a combined sample list, the combined sample list comprising a random sample of the imbalanced large scale data set;

feeding, by the one or more processors, the combined sample list into a prediction model enabling the prediction model to provide predictive capabilities with negligible variance for the imbalanced large scale data set; and provide, over the computer network and to the one or more server computing devices, an estimate associated with the prediction model, wherein the one or more server computing devices cause content to be displayed to at least one user device based on the one or more server computing devices analyzing the estimate.

9. The method of claim 8, further comprising shuffling positive samples and negative samples in the combined sample list.

10. The method of claim 8, further comprising determining the additional sample data point is a negative.

11. The method of claim 8, further comprising replacing an existing negative sample in the negative list when Nn=N−Nr with probability Nn/Ns.

12. The method of claim 8, wherein negative samples are added from the stream of sample data points to a negative list when Nn<N-Nr.

13. The method of claim 8, further comprising determining the additional sample data point is a positive.

14. The method of claim 8, wherein the number of desired positive cases is equal to the target number of observations in a sample times the number of parameters to be estimated in the data times a multiplier.

15. A computerized system comprising one or more processors and a non-transitory computer storage media storing computer-useable instructions that, when used by the one or more processors, cause the one or more processors to:

receive, over a wired or wireless computer network, a stream of sample data points from an imbalanced large scale data set;

add positive samples from the stream of sample data points to a positive list until the positive list contains a desired number of positive samples, the desired number of positive samples being equal to a target number of observations in a sample times a number of parameters to be estimated in the imbalanced large scale data set times a multiplier;

add negative samples from the stream of sample data points to a negative list until the negative list contains a desired number of negative samples;

combine the positive list with the negative list to generate a combined sample list, the combined sample list comprising a random sample of the imbalanced large scale data set; and feed the combined sample list into a prediction model enabling the prediction model to provide predictive capabilities with negligible variance for the imbalanced large scale data set.

16. The computerized system of claim 15, wherein the computer-usable instructions, when used by the one or more processors, further cause the one or more processors to shuffle positive samples and negative samples in the combined sample list.

17. The computerized system of claim 15, wherein the computer-usable instructions, when used by the one or more processors, further cause the one or more processors to replace an existing negative sample in the negative list when Nn>=N−Nr with probability Nn/Ns.

18. The computerized system of claim 15, wherein negative samples are added from the stream of sample data points to a negative list when Nn<N−Nr.

19. The computerized system of claim 15, wherein the computer-usable instructions, when used by the one or more processors, further cause the one or more processors to determine if the sample data points are a positive or negative sample.

20. The computerized system of claim 15, wherein the sample data points are received from a cluster of machines, with each machine in the cluster contributing to a representative portion of the sample data points and each machine in the maintaining a unique positive and negative list.

* * * * *